United States Patent
Perner et al.

(10) Patent No.: US 8,436,483 B2
(45) Date of Patent: May 7, 2013

(54) ENERGY GENERATION PLANT DRIVEN BY WIND OR WATER CURRENTS

(75) Inventors: Norman Perner, Neu-Ulm (DE); Benjamin Holstein, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 823 days.

(21) Appl. No.: 12/448,956

(22) PCT Filed: Nov. 23, 2007

(86) PCT No.: PCT/EP2007/010173
§ 371 (c)(1),
(2), (4) Date: Nov. 4, 2009

(87) PCT Pub. No.: WO2008/086839
PCT Pub. Date: Jul. 24, 2008

(65) Prior Publication Data
US 2010/0052325 A1    Mar. 4, 2010

(30) Foreign Application Priority Data
Jan. 18, 2007  (DE) .......................... 10 2007 003 618

(51) Int. Cl.
*F03D 9/00*        (2006.01)
*H02P 9/04*        (2006.01)

(52) U.S. Cl.
USPC ......................................................... 290/44

(58) Field of Classification Search ............. 290/44, 290/55; 415/4.1, 4.2, 4.5
See application file for complete search history.

(56) References Cited

U.S. PATENT DOCUMENTS

| | | | | |
|---|---|---|---|---|
| 3,911,300 | A * | 10/1975 | Lebkuchner | 310/86 |
| 6,278,197 | B1 * | 8/2001 | Appa | 290/55 |
| 6,794,781 | B2 * | 9/2004 | Razzell et al. | 310/114 |
| 8,154,146 | B2 * | 4/2012 | Fischer et al. | 290/55 |
| 2001/0035651 | A1 * | 11/2001 | Umemoto et al. | 290/44 |
| 2003/0175109 | A1 * | 9/2003 | Brock et al. | 415/4.2 |

(Continued)

FOREIGN PATENT DOCUMENTS

| DE | 44 02 184 | 11/1995 |
|---|---|---|
| DE | 199 54 964 | 5/2001 |

(Continued)

OTHER PUBLICATIONS

International Search Report and Written Opinion dated Sep. 15, 2009 from PCT Application No. PCT/EP2007/010173.

(Continued)

*Primary Examiner* — Julio Gonzalez Ramirez
(74) *Attorney, Agent, or Firm* — Ohlandt, Greeley, Ruggiero & Perle, L.L.P.

(57) ABSTRACT

Power generation plant for obtaining electrical power from a water or air flow includes a turbine; an electrical generator, having a coaxial configuration of a rotor and a stator. The rotor is an external rotor and part of an annular support structure for the turbine. The stator is housed in a stator housing which is sealed to the ambient medium and a wall area of the sealed stator housing running in the area of the gap between rotor and stator so that the rotor is situated radially outside the sealed stator housing and the magnetic interaction between rotor and stator occurs through this wall area. A mount for the annular support structure includes the rotor. The mount is situated adjoining the gap between the rotor and stator and is supported on the external circumference of the sealed stator housing.

12 Claims, 5 Drawing Sheets

U.S. PATENT DOCUMENTS

| | | | |
|---|---|---|---|
| 2004/0108781 A1 | 6/2004 | Razzell | |
| 2006/0152014 A1 | 7/2006 | Grant et al. | |
| 2007/0205602 A1* | 9/2007 | Willey et al. | 290/44 |
| 2007/0222223 A1* | 9/2007 | Bagepalli et al. | 290/55 |
| 2008/0197797 A1* | 8/2008 | El-Ibiary | 318/567 |
| 2011/0260461 A1* | 10/2011 | Egoshi et al. | 290/55 |

FOREIGN PATENT DOCUMENTS

| | | |
|---|---|---|
| DE | 102 55 745 | 6/2004 |
| DE | 103 54 953 | 6/2005 |
| EP | 1 394 406 | 8/2003 |
| EP | 1394406 A2 * | 3/2004 |
| JP | 2004254384 | 9/2004 |

OTHER PUBLICATIONS

International Preliminary Examination dated Dec. 15, 2008 from PCT Application No. PCT/EP2007/010173.

International Preliminary Report on Patentability dated Dec. 15, 2008 from PCT Application No. PCT/EP2007/010173.

Letter of Examination Report (Search Report) for corresponding Taiwan Patent Application No. 096149647 dated Jan. 25, 2013.

* cited by examiner

ENERGY GENERATION PLANT DRIVEN BY WIND OR WATER CURRENTS

BACKGROUND OF THE INVENTION

1. Field of the Invention

The invention relates to a power generation plant, which is driven by a wind or water flow, in particular a power generation plant for obtaining electrical power from a running water flow or ocean current or by wind power in the offshore area.

2. Description of Related Art

Immersed power generation plants implemented independently of dam structures, which are driven by the kinetic energy of a water flow, in particular an ocean current, represent a great potential for the exploitation of regenerative power sources. Because of the high density of the flow medium, a low flow velocity of approximately 2 to 2.5 m/seconds may already be exploited to obtain power cost-effectively. Flow conditions of this type may be provided either as a tidal flow or other ocean currents are exploited, which may achieve economically usable velocities in particular in straits. Flows of this type may drive flow power plants, which have a similar design as wind power plants, i.e., rotors having rotor blades are used as the water turbines. However, other water turbine concepts, such as vertical turbines and tubular turbines, are also conceivable. In addition to the area of application of obtaining power from ocean currents, freestanding, immersed power generation plants of this type may also be used in running bodies of water, in which no barrages having water turbines installed therein may be erected because of provisions due to environmental protection or ship traffic.

A fundamental difficulty in the operation of immersed flow power plants is that, in particular in the offshore area, the maintenance is complex. The water turbine and the electrical generator associated therewith must typically be raised above the water level for this purpose. Because of the dependency on the weather conditions and the waves, floating crane systems are disadvantageous for this purpose, so that the flow power plants are often implemented as buoyant units, which have an anchor on the ocean floor or the base of the running body of water. Buoyant units of this type may be designed so that in case of service, it is possible to raise them to the water surface. According to an alternative design, the flow power plant is retained in the flow on a bearing and support structure, in particular a column-shaped configuration, which stands on the ocean floor. If this bearing and support structure is continued up to the water level, it is possible to move the power generation plant vertically on this structure for maintenance. Support and bearing structures of this type typically project beyond the water level and a lift mechanism is associated therewith. In addition to the complex design, it is disadvantageous for this purpose that the structures, which are situated above the water level and just underneath it, may represent hazardous obstructions for ship travel.

Similar problems arise for offshore wind power plants, which are subjected to continuous corrosion by the salt spray atmosphere surrounding them. Maintenance work is already difficult to execute because of the location. In addition, future offshore wind power plants will be implemented as high-performance and large-scale, which in turn places special requirements on lifting systems for maintenance.

OBJECT OF THE INVENTION

Proceeding from the maintenance problems of the power generation plants according to the species, the object of the invention comprises designing an immersed flow power plant or a wind power plant so that it is low-maintenance, and service may be dispensed with entirely as much as possible. In addition to the corrosion resistance and robustness, the power generation plant is to be distinguished by a simple design.

BRIEF SUMMARY OF THE INVENTION

The object is achieved by the features of the independent claim. Advantageous designs result from the subclaims.

The power generation plant according to the invention has a reduced number of individual components to increase the reliability. In particular, through a direct drive of the generator, on the one hand, the component count in the drivetrain is decreased, on the other hand, by dispensing with transmission components, the typically slow movement of the water or wind turbine is transmitted directly to the generator rotor and the wear, which connected to the service life, decreases.

Furthermore, this opens up the possibility of dispensing with oil-based lubricant circuits in the nacelle of a water or wind turbine.

For example, if the generator is implemented as a multipole synchronous generator and in particular as a ring generator, in spite of the slow peripheral velocity, an induced voltage may be generated, whose frequency corresponds to a rapidly running generator. Alternative designs for slowly running electrical generators of this type may comprise the plurality of the poles not being implemented on a single circumference of an annular rotor-stator pair, but rather these poles being distributed onto multiple axially spaced generator units, which is described, for example, in DE 103 54 953 A1.

In addition to the direct drive for the generator, for the power generation plant according to the invention, a can is provided, i.e., in the area of the gap between the rotor and the stator of the electrical generator, a partition wall runs, through which the magnetic field penetrates for the interaction between rotor and stator, but which partitions off the stationary components of the electrical generator from the outside area, without shaft seals, which are susceptible to maintenance, having to be used. The partitioning results in a liquid-tight closed internal area in the case of a power generation plant driven by a water flow and correspondingly in a gas-tight closed internal area for a wind power plant. Accordingly, the stator of the power generation plant according to the invention is mounted inside a hermetically closed stator housing, for which static seals are used exclusively. In comparison thereto, if moving seals are used, such as a shaft seal, a certain amount of leakage cannot be reliably prevented, so that bilge pump systems and filter and/or air preparation systems for the internal area cannot be dispensed with. For a power generation plant having stator encapsulation according to the invention, however, this is not necessary. The further controller of the power generation plant and the components needed for the power electronics and the frequency inverter for connecting the electrical generator to a network having constant network frequency may also be accommodated in the stator housing in the protected environment.

A module comprising a water or wind turbine, which is referred to hereafter as the turbine, and the rotor of the electrical generator is especially preferred for implementing the direct drive. If the electrical generator is designed as a ring generator, an annular external rotor of the generator is especially preferably used, which is simultaneously used as a support structure for a propeller-shaped turbine. Accordingly, the ends of the propeller blades pointing toward the rotational axis are connected to an annular support structure, which, according to an advantageous design, carries a sequence of permanent magnets in the area of its internal circumference, which form the magnetic components of a permanently-excited rotor of the electrical generator. As a result, the turbine and the annular support structure which receive the rotor of the generator are structurally connected and situated coaxially and concentrically. The stator housing having the stator windings received therein and encapsulated are located radially inside and again concentrically to this module.

The annular support structure preferably has a radius which, on the one hand, is adapted to the mechanical requirements for supporting the load introduction by the turbine and, on the other hand, to the installation space requirement for housing the generator rotor. The propeller-shaped turbine may be implemented in large scale as an external rotor, which results in high-performance power generation plants because of the large turbine diameter.

As a further measure according to the invention, the mounting of the annular support structure is implemented so that the static and dynamic torques introduced via the turbine result in the lowest possible bearing forces. According to the invention, for this purpose the mounting is situated directly in the area of the gap between rotor and stator of the electrical generator. The mounting is especially preferably supported against the stator housing which encapsulates the stator and is situated on the largest possible external circumference. In addition, at least two bearings having a sufficient axial spacing are preferred, so that high tilting torques may be absorbed by the opposing bearing areas and the deformation of the bearing components simultaneously remains in a range suitable for continuous load.

Bearings having roller bodies are preferably used, which are received in bearing shells, which are implemented in the annular support structure and on the exterior on the stator housing on the opposite side. Because of the configuration of the turbine on the radial exterior, the size of the annular support structure and thus the diameter of the bearing shells may be selected so that their precise production is executable. As an alternative to bearings having roller bodies, friction bearings may be used, which in turn have running faces, which are implemented on the annular support structure and the stator housing.

Through the mounting according to the invention in the area of the stator-rotor gap of the electrical generator, it is additionally possible to keep the gap distance as constant as possible even in the event of strong loads, whereby low gap spacings and thus a higher efficiency of the generator may be implemented. In addition, it is possible to use water-lubricated bearings as the mounting components because of the minimized bearing forces, which are used outside the stator housing and thus in the area of the power generation plant which liquid flows around, without oil-based lubricants being discharged from the mount to the surrounding water.

According to an advantageous design according to the invention of the power generation plant, the bearing components are protected from abrasive components in the flowing water, in the event of ocean currents, these are particularly sediments entrained by the flow. In the case of wind power plants, problems are caused by particles, such as sand grains, which are transported by the air flow. In the simplest case, the protection is achieved by associating seal components, such as a labyrinth seal, with a bearing, so that it is separated from the outside by a first element having a filtering action. Additionally or alternatively, according to a refinement, a device is provided between the stator housing and the annular support structure which causes an outwardly directed flow of filtered ambient water for a power generation plant driven by a water flow. For a wind power plant according to the invention, flushing with filtered air or another flushing gas is correspondingly performed. For better understanding, a design of a seal or bearing flushing for a power generation plant driven by a water flow is described hereafter. One skilled in the art may perform corresponding adaptations for a wind power plant.

Accordingly, the water-lubricated bearing is particularly advantageously permeated with filtered water in the outward direction, which is achieved especially simply with a dual-row bearing configuration and a filtered water supply provided between the axially spaced bearing components. If a seal component, such as a labyrinth seal, is additionally provided for protection on the outside area of the bearing, according to an alternative design, the outwardly directed permeation with filtered water may occur only through the seal components, so that abrasive materials are prevented from being washed to the bearing. According to a refinement, the filtered water flow occurs both through the bearing, and also subsequently through the seal element associated with the outside area, so that both bearing flushing and also seal flushing may be implemented. Bearing flushing without simultaneous seal flushing or alternatively dispensing with the seal, which is susceptible to malfunction, and using an open bearing having bearing flushing by filtered water is also possible.

According to a further design of the invention, the turbine is designed having adjustable blades. In the case of a propeller-shaped geometry for the turbine, the power consumption and the speed may be regulated on the basis of the blade angle setting. To implement such a setting of the turbine, which is adapted to the particular flow conditions and/or the operating situation, it is necessary for the encapsulation of the stator according to the invention in a liquid-tight stator housing to provide a separate power source for operating the control elements for adapting the turbine, in particular a unit for the blade angle setting, for the module made of annular support structure, rotor, and turbine. For this purpose, a revolving hydraulic pump associated with the rotating module may be used, which engages with teeth on the stator housing, for example, and which is used for the operation of hydraulic positioning units for adapting the turbine. Alternatively, the power transmission and/or a signal transmission, for example, of control and monitoring signals and signals for the sensors, may be performed from the stator housing to the rotating module without contact, i.e., inductively, whereby an electrical actuator may be implemented in particular for the blade angle setting.

According to an alternative design, active adjustment of the turbine is dispensed with, i.e., in the case of a propeller-shaped turbine, the blade angle setting. This in turn increases the reliability due to the reduction of the component count resulting therefrom. However, the disadvantage is that precautions must be taken in order to reduce the power introduction into the turbine as rapidly as possible in case of load shedding. For safely braking the turbine, according to a refinement of the invention, a design of the turbine is selected which only rotates the turbine blades into the attack position in case of an applied generator torque, i.e., for the normal operating case, and for the case in which the generator torque suddenly breaks off, the turbine is automatically returned into a non-attack position by the flow forces on the turbine blades, whereby the uncontrolled running away of the turbine may be minimized even without complex braking units.

This concept is implemented in that the turbine comprises at least two subcomponents, which are pivoted relative to one another by the action of the generator torque and rotate the turbine blades into the flow for this purpose. If load shedding occurs, this relative pivoting is reset by the flow forces because the generator torque stops, so that the generator torque forms the actual positioning and control element, the control force for the active setting of the turbine resulting from the generator torque—this represents the normal operating case. The rotating of the turbine blades out of the flow is controlled, i.e., triggered, in turn by the stoppage of the generator torque.

BRIEF DESCRIPTION OF THE DRAWINGS

The invention is explained hereafter on the basis of preferred exemplary embodiments in connection with the figures. In the individual figures.

DETAILED DESCRIPTION OF THE INVENTION

Figure 1:
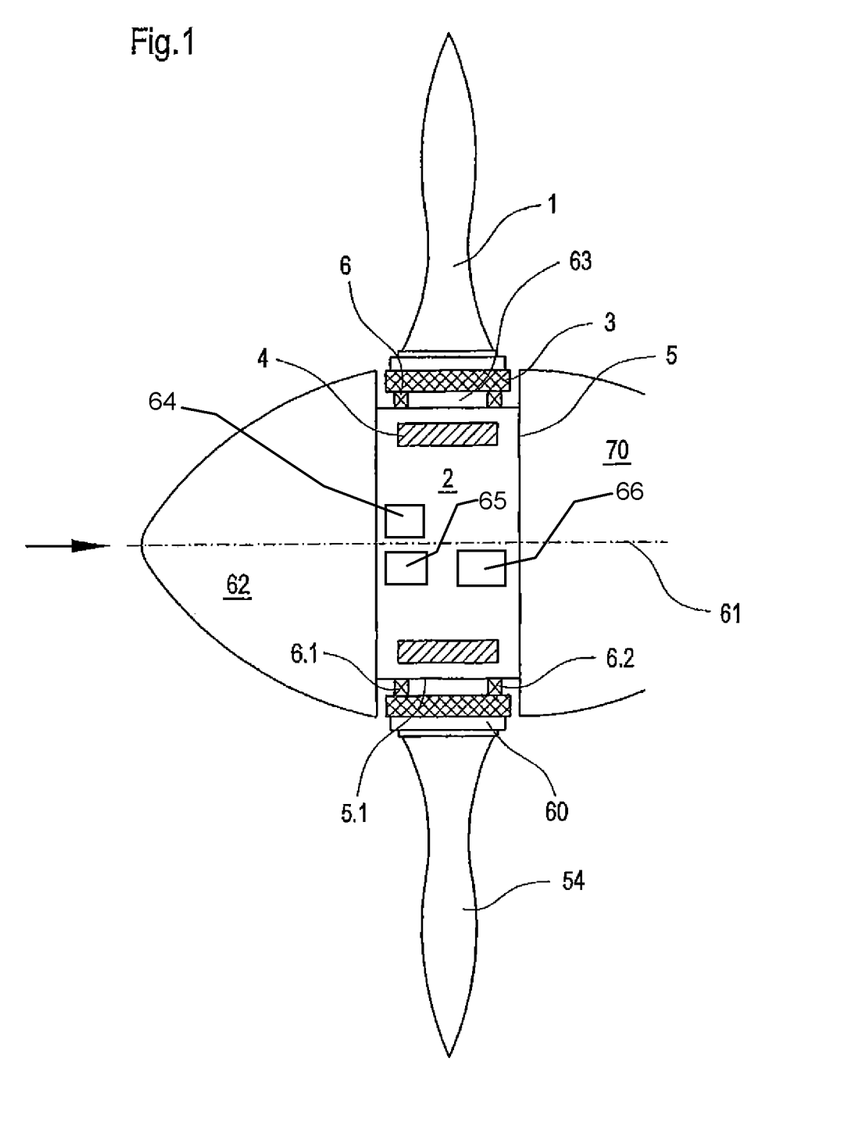
FIG. 1 shows a power generation plant according to the invention in axial section.

FIG. 1 shows the fundamental concept according to the invention of a low-maintenance power generation plant in axial section. The ocean current and/or river water current flows against it as shown by the arrow. In the present exemplary embodiment, the turbine 1 is implemented as propeller-shaped and comprises at least two propeller blades 54 for the exemplary embodiment shown. According to the invention, the turbine 1 is connected directly, i.e., without gearbox stages interposed, to the rotor 3 of an electrical generator 2, a compact module in coaxial, concentric configuration corresponding to the illustration from FIG. 1 especially preferably being used. The propeller blades 54 of the turbine 1 are linked on the radial interior to an annular support structure 60, the magnetic components of the rotor 3 being integrated in the annular support structure 60. The configuration of multiple permanent magnets on the inner circumference of the annular support structure 60 is preferable for this purpose, for example, high-performance magnets made of a neodymium-boron-iron alloy being used. The stator 4 having electrical steel packets and induction windings of the electrical generator 2 is located inside a liquid-tight, dry stator housing 5, so that a wall area 5.1 in the meaning of a can in the gap 63 between the rotor 3 and the stator 4 of the electrical housing 2 partitions the encapsulated area inside the stator housing from the outer rotor, which the water washes around. The stator 4 is situated in relation to the rotor 4 coaxially with respect to the axis 60 and concentrically and internally. In addition to the sealed stator housing 5, the nacelle 70 of the power generation plant may comprise further areas, such as a housing hood 62, which are not completely sealed with respect to the surrounding media. Furthermore, the attachment of the nacelle 70 and a support and bearing structure is not shown in detail in the figures.

The wall area 5.1 in the gap 63 between rotor 3 and stator 4 must comprise a material which attenuates the magnetic field of the rotor as little as possible. For the power generation plant according to the invention, austenitic steel is preferred in particular for this purpose for implementing the liquid-tight stator housing 5. It is essentially nonmagnetic at normal temperatures. In addition, a corrosion-resistant material is to be selected, in particular in the event of operation of the power generation plant in salt water or a salt spray atmosphere. Alternatively, metal alloys based on aluminum and zinc may be used, these alloys being able to have corrosion protection coatings based on polymers.

Preferably, a multipole synchronous generator in the form of a ring generator, which is connected to a line network via frequency inverters, is used as the electric generator 2.

Furthermore, for the power generation plant according to the invention, a mount 6 is provided in the area of the gap 63 between the rotor 3 and the stator 4 of the electric generator 2. The mount 6 of the annular support structure 60, in which the rotor 3 is integrated, is preferably implemented in two rows and comprises at least two bearing components 6.1 and 6.2, which are spaced apart axially, and which are each axially adjacent to the gap 63. These are used for the purpose of setting a specific gap spacing and supporting the turbine forces. Through a mount situated in this way, it is possible to introduce the torques absorbed by the turbine 1 in the area of the external circumference of the stator housing 5. Because of the large-scale bearing components 6.1, 6.2 and their large axial and radial extensions, it is possible to keep the compression forces occurring in the bearing components 6.1 and 6.2, in particular in the bearing shells, and the deformations resulting therefrom low. Through this measure, bearing components 6.1, 6.2, which are implemented as water-lubricated bearings, may also be used for the high dynamic and static torques acting on a turbine 1. This is especially important in regard to the fact that an external rotor having flow around it is used and the area of the gap 63 is also flooded by propellant water.

The implementation of the bearing 6 may be selected in the scope of typical measures of one skilled in the art and comprises single-row cylinder roller bearings having sufficient axial extension or dual-row, axially spaced ball roller bearings, preferably each having water-lubricated ceramic inlays, or friction bearing bushes. According to an especially preferred design, the bearings 6 are designed so that they provide the moving module, comprising the annular support structure 60 having integrated rotor 3 and the turbine 1, with additional support in the axial direction. Furthermore, the bearing shells may be implemented in the stator housing 5 and in the annular support structure 60. Their diameters are sufficiently large so that the bearing force compression forces remain small. On the other hand, because of the configuration of the annular support structure 60 on the radial interior of the turbine 1, the diameters are small relative to an encapsulated turbine, so that bearing shells in these components may still be produced precisely.

In summary, the power generation unit shown according to FIG. 1 is distinguished in that gearbox components which are susceptible to wear are superfluous due to the direct generator drive. In addition, through the can configuration, a sealed inner area of a stator housing 5 is formed, which only has static seals and in which all electrical control and power components which are susceptible to moisture or corrosion are housed. It is preferred to house a plant controller 64 and/or components of the power electronics 65 and/or a frequency convertor 66 in the sealed stator housing 5.

In addition, the mount 6 according to the invention of the revolving components by a bearing shell supported on the stator housing 5 and in particular its outer circumference allows the gap spacing between the rotor 3 and the stator 4 of the electrical generator 2 to be kept constant even in the event of strong torque loads, and also allows the bearing forces to be minimized for such conditions enough that water-lubricated bearings may be used without special design effort.

Furthermore, providing a disk-shaped configuration instead of the coaxial configuration of generator rotor 3 and stator 4 is conceivable, according to the invention, a liquid-tight stator housing again being provided and the rotatable module made of generator rotor 3 and turbine 1 preferably being supported via a mount on the outer circumference of the stator housing. Alternatively, the bearing support on the stator housing may also be performed frontally on a large radius. This variant is not shown in detail in the figures.

Figure 2:
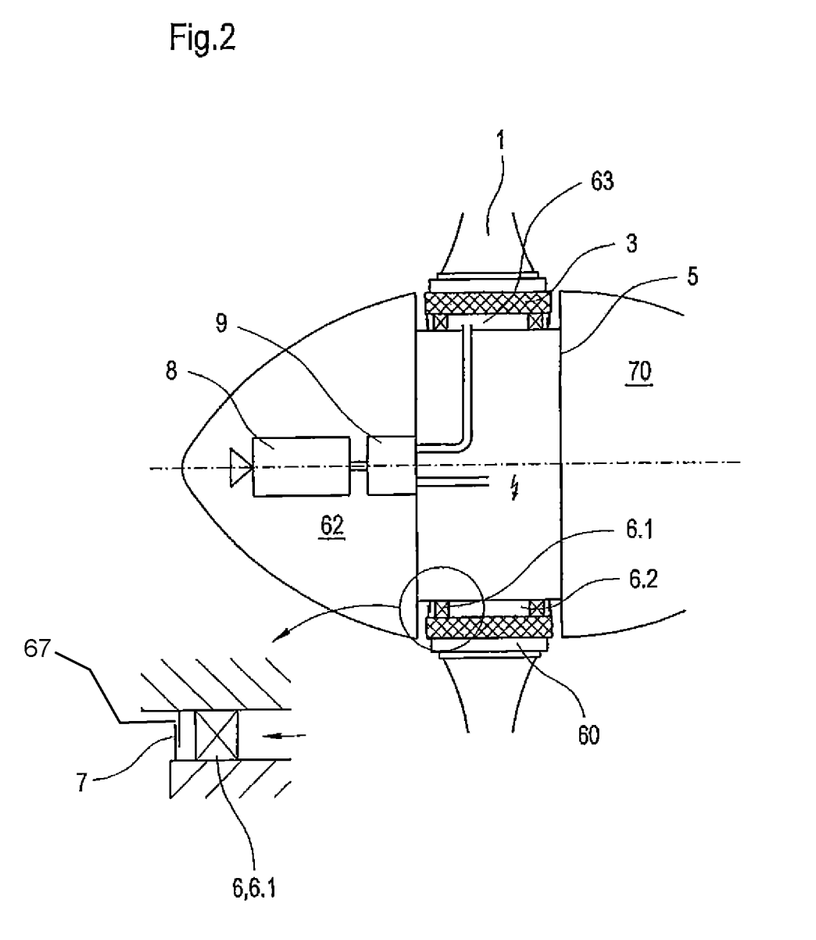
FIG. 2 shows a power generation plant according to the invention from FIG. 1 in a design having a pump-filter unit for the bearing and/or seal flushing.

Through the power generation plant according to the invention, shaft seals, which are susceptible to breakdown and which are additionally usually not completely tight, are replaced by a liquid-tight and/or gas-tight encapsulated inner chamber, in which the stator 4 of the electrical generator 2 is located, in connection with a rotor 3 subjected to the external environment. In this case, an ocean current having a high proportion of sediment, in particular sand and the like, may result in bearing wear. This is correspondingly true for wind power plants because of the particles transported by the airflow. The inventors have therefore recognized that an advantageous refinement of the invention comprises bearing and/or seal flushing. A first embodiment is shown in FIG. 2. Firstly, according to the enlarged detail, in addition to the bearing 6, a seal element 7, in particular a labyrinth seal 67 is provided. This seal prevents the introduction of sediments into the bearing area and acts like a filter. However, because of the high torques acting on the turbine 1, slight relative movements cannot be prevented, which cause a variation of the gap fitting in the seal elements 7. Therefore, according to an especially preferred embodiment, a device is provided which causes a continuous outflow of filtered ambient water and/or filtered ambient air out of the bearing area. In the simplest case, only the filter element 7 is permeated for this purpose, so that a penetration of abrasive media from the ambient flow is suppressed. However, additional bearing flushing is especially preferred, which may be caused, for example, in that an inflow of the filtered ambient medium is caused in the gap area between the bearing elements 6.1 and 6.2, which are laterally situated with axial spacing. According to an alternative design, the water-lubricated bearings are replaced by bearings having grease lubrication, which may be implemented as lost lubrication using environmentally-compatible greases. The escaping grease transports abrasive solids from the bearings to the outside area.

According to the simplified schematic illustration in FIG. 2, for this purpose, a filter 8, such as a cartridge filter, is provided in the housing hood 62 of the power generation plant. If the ambient medium is supplied to this filter 8 in proximity to the access and then conducted radially outward, a suction effect will automatically arise in the supply lines from the filter 8 to the gap 63, which run radially outward, due to the liquid entrainment in the annular gap, so that the outwardly directed flow through the bearings 6.1, 6.2 and/or through the seal elements 7 is already formed by the rotational movement of the turbine 1. In addition, a filter pump 9 may be provided, which is used for the purpose of amplifying the pressing of the filtered ambient medium into the gap 63 and thus improving the bearing and/or seal permeation. The filter system 8 and the filter pump 9 form a pump-filter unit.

Figure 3:
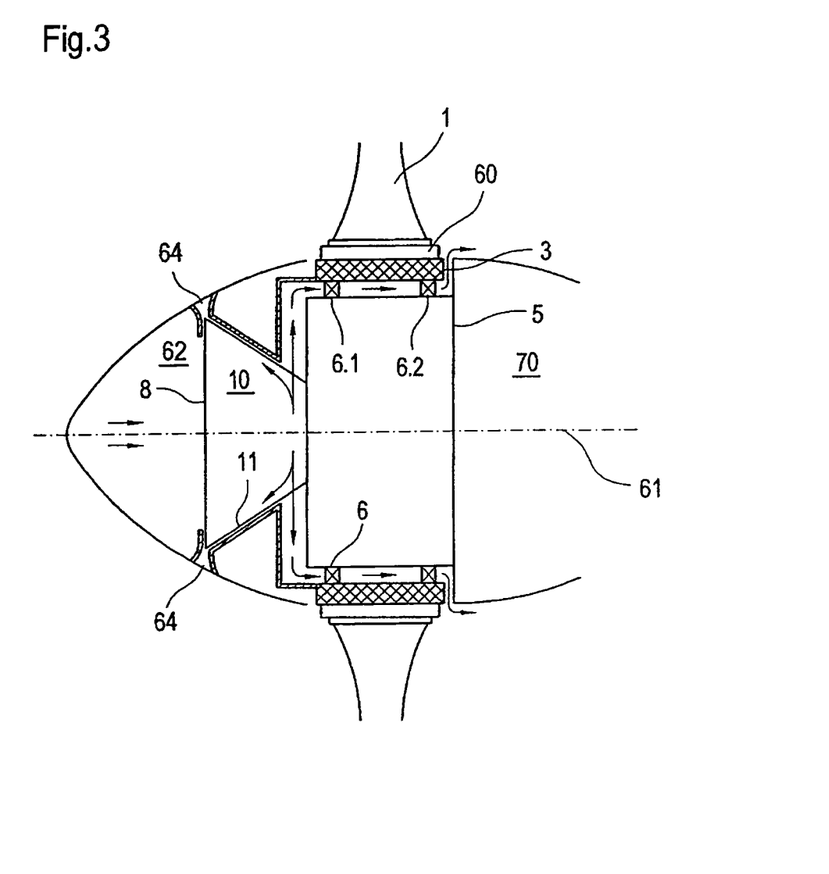
FIG. 3 shows a pump-filter unit for a power generation plant according to the invention, which operates according to the centrifugal principle and is self-cleaning.

In a further embodiment, a self-cleaning filter 8, based on the centrifugal force principle, is shown in FIG. 3 for generating filtered ambient medium for the bearing flushing. This filter has a plate-shaped element 10 in the housing hood 62, on whose conical outer walls 11 supplied pollutants are evacuated outward and thus in the lateral direction separately from the remaining filtered water flow in the event of a rotational movement, driven by a coupling to the turbine, corresponding outlet openings 64 for the separated pollutants being able to be provided on the hood outer side.

The pump-filter unit may be housed outside the sealed stator housing 5, which in turn simplifies the encapsulation. Alternatively, the pump-filter unit is situated in the sealed stator housing 5, whereby the precautions for the corrosion protection of the pump-filter unit are simplified. The pump-filter unit is preferably situated centrally in the stator housing 5 and has a hydraulic feed-through which opens into an outlet in the area of the seal element 7 and/or the mount 6.

Figure 4:
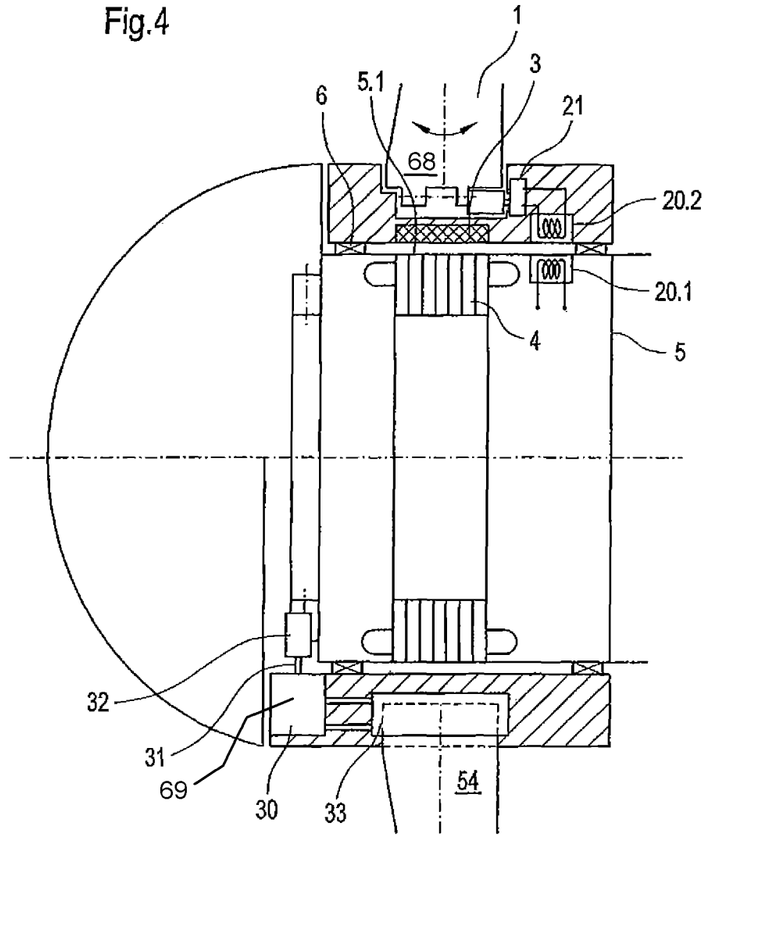
FIG. 4 shows, for a power generation plant according to the invention, two variants for a blade angle setting having separate and encapsulated power generation, respectively.

In FIG. 4, a refinement of the invention is shown, which connects the concept of a sealed, closed generator housing 5 to an adjustment capability for the turbine 1. For the case that the turbine 1 is implemented in the form of a propeller, this adjustment capability is preferably a device for blade angle adjustment 68, setting the propeller blades 54. For a hydraulic adjustment, a fluidic connection is necessary between the stator housing 5 and the rotating components of the power generation plant running therefrom in order to supply the hydraulic components through an inflow of operating medium from the interior of the stator housing. For this purpose, a hydraulic distributor having a rotating feed-through may be provided on the stator housing 5, which is not shown in detail in the figures, however. In order to be able to dispense with moving seal components on the stator housing 5 entirely, however, instead a hydraulic pump 30 which revolves with the rotating module is used, which engages via a pinion 31 with a fixed sprocket 32, which is connected to the stator housing 5. As the turbine 1 revolves, if an operational engagement is set, the hydraulic motor 30 may be driven and a hydraulic control element 33 for the blade angle adjustment may be actuated via hydraulic components (not shown in detail), such as a reservoir and hydraulic valves.

According to an alternative design, which is shown schematically outlined in the upper area of FIG. 4, instead of a hydraulic drive, an electric motor is used, the power supply for the electric actuating drives 21 being performed via an inductive power transmission from the fixed side to the revolving side using a coil configuration. Signals may be inductively transmitted correspondingly. Advantageously, a coil collar 20.1 is provided for this purpose, for example, in the fixed part, which is interconnected so that a voltage may be induced synchronously to the rotational movement of the revolving side in a driven single coil 20.2. In the scope of typical measures of one skilled in the art, instead of this single driven coil, a plurality of moving coils may also be used. It is also conceivable to accommodate the coil collar 20.1 in the revolving part and provide one or more counter coils in the fixed part.

If, for an alternative design of the power generation plant according to the invention, active adjustment of the turbine 1 is dispensed with, for the case of load shedding, the power introduction may nonetheless be minimized if the turbine 1 is designed so that its activation is a function of an applied generator torque and a return to a passive setting is caused automatically when the torque stops. It is to be noted for this purpose that such a design may be implemented without a complex controller if the generator torque is transmitted mechanically to an angle setting unit for the turbine blades.

Figure 5A:
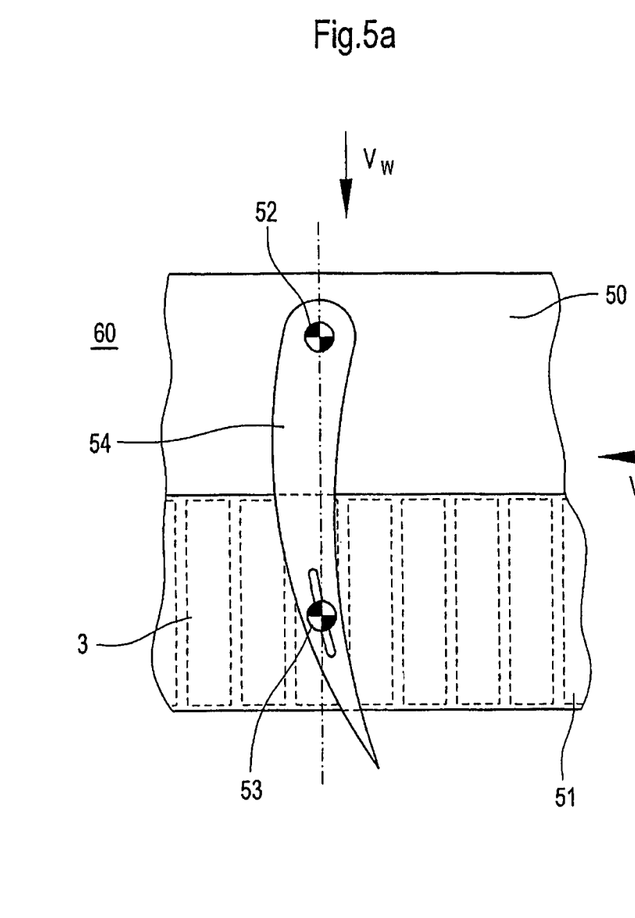
FIGS. 5a and 5b schematically show, in simplified form, active and passive setting of the turbine control via the generator torque.
Figure 5B:
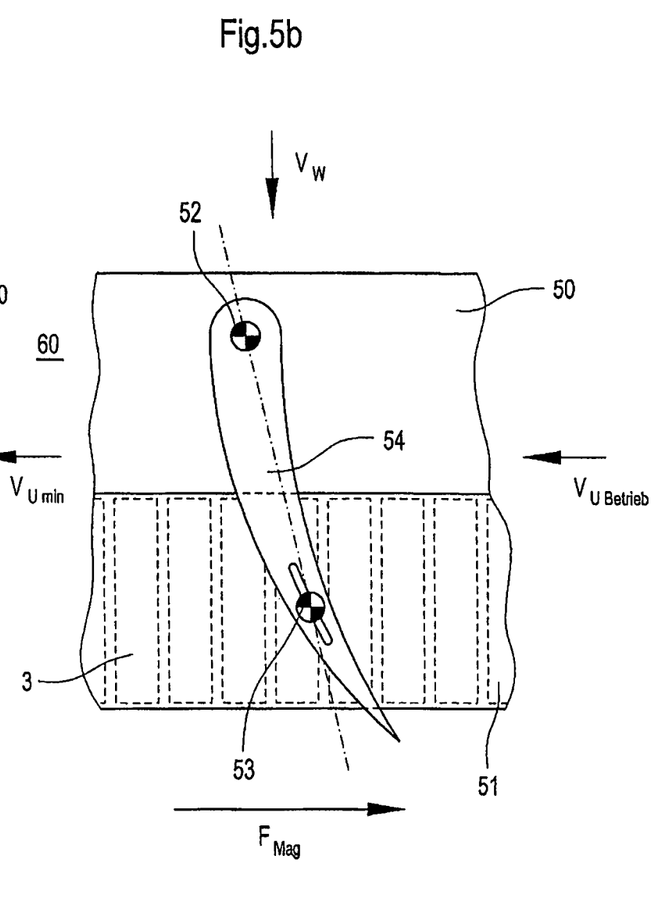

A possible design of this principle is shown in FIGS. 5*a* and 5*b*, a propeller-shaped turbine 1 being used and the two views being shown schematically simplified as horizontal projections of the annular support structure 60 along the propeller axes. The annular support structure 60 comprises a first part 50 and a second part 51, which supports the magnetic components and in particular the permanent magnets of the rotor 3, and via which the generator torque acts during normal operation. These two parts 50, 51 are pivotable relative to one another in the peripheral direction, the setting angle of the propeller blades being changed by such a relative rotation. For this purpose, in the exemplary horizontal projections in FIGS. 5a and 5b, a propeller blade 54 and its linkage points on the first part 50 and on the second part 51 are shown.

If a rotatable mounting is performed at a first linkage point 52 on the first part 50 in a windward area of the propeller blade 54, the flow direction of the water $V_W$ indicated in FIGS. 5a and 5b will act in the direction of a parallel setting of the propeller blade, i.e., if only the first linkage point 52 were on the first part 50, the result would be a rotation of the propeller blade 54 out of the engagement setting, in which the turbine 1 takes essentially no power from the ambient flow.

A second linkage point 53 is provided on the second part 51, via which the generator torque acts, which is used for the purpose of rotating the propeller blades 54 into the flow through the support action of the generator torque and thus activating the turbine 1. The mode of operation results from the comparison of FIGS. 5a and 5b. The effect of the generator torque is obvious in FIG. 5b. This torque will act as a restoring force in the peripheral direction opposite to the rotational direction of the rotor 3 (see the force direction $F_{mag}$ on the magnetic components in FIG. 5b for this purpose). If the second linkage point 53 is displaced to the lee side relative to the propeller blade axis, because of the retention force on the second part 51 and the relative pivoting ability between the first part 50 and the second part 51, automatic tilting occurs and thus the rotor blades of the turbine 1 are adjusted into the flow. This case is shown in FIG. 5b, the connection axis of the first linkage point 52 and the second linkage point 53 assuming a specific attack angle to the flow direction $F_W$, i.e., the propeller blade 54 may absorb power from the ambient flow and drive the generator. Without power loss at the electric generator, i.e., in case of load shedding, the selective force from the generator torque, which acts only on the second part and brakes the revolution of the turbine 1, stops and the flow forces acting on the profile of the propeller blades will cause a return to the setting rotated out of the flow, which is shown in FIG. 5a. The turbine 1 may be stopped accordingly for maintenance purposes.

The fundamental concept, according to which the turbine 1 is activated and deactivated on the basis of the relative movement of two subcomponents of the support and bearing structure and a higher generator torque, which has a retaining action, acts on one of these two parts during operation in comparison to the other part, may be refined in detail in the scope of typical measures of one skilled in the art. For the exemplary embodiment shown in FIGS. 5a and 5b, the second, lee-side linkage point 53, which is braked by the generator torque, may have an actuating bearing, which allows a certain relative movement along the blade profile for the linkage point, which is necessary to implement a combined relative movement of the first part and the second part 50, 51 and the rotational movement of the propeller blade 54 around its propeller axes. For this purpose, an oblong hole configuration is shown schematically simplified in FIGS. 5a and 5b, along which the second linkage point 53 may slide depending on the existing angle. Furthermore, it is preferable to limit the relative movement between the first part 50 and the second part 51. Stops are used for this purpose. A first stop is used for the inactive setting according to FIG. 5a for the purpose of maintaining a certain minimal propeller blade angle, which also allows a minimal power absorption by the turbine during idle, which is used for the purpose of overcoming the friction forces enough that a slow revolution speed exists for idle operation. However, it must be reliably prevented by the selection of the stop that turbine runaway is also prevented at the maximum possible applied flow. Furthermore, a second stop may be provided for the operating setting according to FIG. 5b, which is used for the purpose of fixing a maximum propeller blade angle, so that the two linkage points 52 and 53 are relieved.

The concept described above of self-control of the turbine caused via the generator torque and the automatic reaction capability to load shedding allows an additional brake for fixing the turbine to be implemented in small scale. In addition, an efficient brake action exists through friction elements, which are implemented in the area of the circumference of the rotor, and act outward from the stator housing on the corresponding counter elements. For an external rotor, which is mounted on the stator housing and thus on a large external diameter, this brake action may be implemented by a simple components which are thus in turn low-maintenance.

The principle described above may be used in a refinement for the purpose of employing the generator torque as a power source and as a positioning signal for the angle setting of the propeller blades. In addition, the end stops maybe actively tracked.

LIST OF REFERENCE NUMERALS 1 turbine
2 electric generator
3 rotor
4 stator
5 stator housing
5.1 wall area
6 mount
6.1, 6.2 bearing components
7 seal element
8 filter system
9 filter pump
10 plate-shaped element
11 conical outer walls
20.1 coil collar
20.2 single coil
21 unit to which power is supplied
30 hydraulic motor
31 pinion
32 sprocket
33 hydraulic control element
50 first part
51 second part
52 first linkage point
53 second linkage point
54 propeller blade
60 annular support structure
61 axis
62 housing hood
63 gap
64 plant controller
65 components of the power electronics
66 frequency converter
67 labyrinth seal
68 device for blade angle adjustment
69 autonomous power generation unit

The invention claimed is:

1. A power generation plant for obtaining electrical power from a water or air flow, comprising:
   a turbine;
   an electric generator, having a coaxial configuration of a rotor and a stator, said rotor being part of an annular support structure, which is directly driven by said turbine, and
   said stator being housed in a stator housing which is sealed with respect to the ambient medium, a wall area of said stator housing running in the area of the gap between said rotor and said stator so that the magnetic interaction between said rotor and said stator occurs through this wall area, wherein a plant controller and/or components of the power electronics and/or frequency inverters are housed inside said sealed stator housing;
   a mount for the annular support structure comprising said rotor, said mount being situated adjoining the gap between said rotor and said stator and being supported on the sealed stator housing;
   water-lubricated bearings being used for the mount and seal elements are associated with the mount, which seal the mount to an outside area against the penetration of abrasive materials, wherein labyrinth seals are used as the seal elements; and
   a flushing unit comprising a pump-filter unit for generating an outwardly directed permeation of the seal elements using filtered ambient medium.

2. The power generation plant according to claim 1, wherein said mount is implemented in multiple rows, first and second bearing components of the mount, which are spaced apart from one another in the axial direction, laterally delimiting the gap between said rotor and said stator.

3. The power generation plant according to claim 1, wherein said electric generator is implemented as a ring generator.

4. The power generation plant according to claim 1, wherein said electrical generator is implemented as a multipole synchronous generator, the rotor comprising permanent magnets.

5. The power generation plant according to claim 1, wherein the wall area of the sealed stator housing in the gap between said rotor and said stator comprises a corrosion-resistant, nonmagnetic material, and especially preferably a corrosion-resistant, non-ferromagnetic material.

6. The power generation plant according to claim 5, wherein an austenitic steel is used as a material for the wall area.

7. The power generation plant according to claim 1, wherein a flushing unit for flushing the mount is provided, filtered ambient medium being used as the flushing medium.

8. The power generation plant according to claim 1, wherein the pump-filter unit is situated outside the stator housing and has an at least indirect mechanical drive connection to the turbine.

9. The power generation plant according to claim 1, wherein the pump-filter unit is situated in the interior of the sealed stator housing.

10. The power generation plant according to claim 1, wherein the pump-filter unit operates according to the centrifugal principle.

11. The power generation plant according to claim 1, wherein the turbine comprises at least two rotor blades, with which a device for blade angle adjustment is associated, the device for blade angle adjustment comprising an autonomous power generation unit or a unit to which power is supplied by inductive coupling from the liquid-tight sealed stator housing.

12. The power generation plant according to claim 1, wherein said turbine comprises a propeller blade and said propeller blade is brought by the action of a generator torque into the active setting for power absorption and is returned to the passive setting, in which the power absorption is reduced, in case of a stopped generator torque, and by the action of flow forces on the propeller blade.

* * * * *